(12) United States Patent
Shimizu

(10) Patent No.: US 7,651,425 B2
(45) Date of Patent: Jan. 26, 2010

(54) VEHICULAR POWER TRANSMITTING APPARATUS

(75) Inventor: Takashi Shimizu, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 91 days.

(21) Appl. No.: 12/100,717

(22) Filed: Apr. 10, 2008

(65) Prior Publication Data

US 2008/0261740 A1    Oct. 23, 2008

(30) Foreign Application Priority Data

Apr. 19, 2007    (JP)    ............... 2007-111026

(51) Int. Cl.
*F16H 3/72*    (2006.01)
(52) U.S. Cl. ........................................... 475/5
(58) Field of Classification Search .................. 475/5
See application file for complete search history.

(56) References Cited

U.S. PATENT DOCUMENTS 6,743,135 B2 *    6/2004    Klemen et al. ................. 475/5

FOREIGN PATENT DOCUMENTS

| JP | 8-48164 | 2/1996 |
|---|---|---|
| JP | 2000-224813 | 8/2000 |
| JP | 2000-272362 | 10/2000 |
| JP | 2001-260669 | 9/2001 |
| JP | 2005-308094 | 11/2005 |

* cited by examiner

*Primary Examiner*—Dirk Wright
(74) *Attorney, Agent, or Firm*—Oblon, Spivak, McClelland, Maier & Neustadt, L.L.P.

(57) ABSTRACT

A case in which a vehicular power transmitting apparatus is stored, has: an annular support portion which surrounds an outer periphery of a planetary gear set and supports a fixed element from among a plurality of gears and a carrier of the planetary gear set; an outer peripheral wall portion that surrounds the annular support portion; a flange portion that forms a mounting surface on an outer portion of the outer peripheral wall portion; and a dividing wall portion which extends to the outside from the annular support portion toward the outer peripheral wall portion and the flange portion, and which forms the flange portion and the mounting surface and divides spaces within the case. A joining portion, in which a fastening hole to which the fastening member is joined and whose axis passes through the dividing wall portion is formed, is integrally formed with the dividing wall portion.

6 Claims, 4 Drawing Sheets

VEHICULAR POWER TRANSMITTING APPARATUS

INCORPORATION BY REFERENCE

The disclosure of Japanese Patent Application No. 2007-111026 filed on Apr. 19, 2007, including the specification, drawings and abstract is incorporated herein by reference in its entirety.

BACKGROUND OF THE INVENTION

1. Field of the Invention

The invention relates to a vehicular power transmitting apparatus.

2. Description of the Related Art

A transaxle type vehicular power transmitting apparatus is known in which i) a planetary gear set that forms a shifting mechanism, ii) a differential mechanism for left and right drive shafts, and iii) driving means for driving an input rotating element of that vehicular power transmitting apparatus, are all housed in a transmission case.

In addition, a front-drive power transmitting apparatus for a four-wheel-drive vehicle is also known in which a motor/generator that capable of generating electricity using power from an engine is provided separate from a driving motor, and which includes a first planetary gear set for reducing output from the driving motor, and a second planetary gear set that serves to distribute power from the engine between the motor/generator and a counter gear.

A vehicular power transmitting apparatus described in Japanese Patent Application Publication No. 8-48164 (JP-A-8-48164), for example, is such that a motor shaft and left and right driveshafts are arranged on the same axis. In addition, a spline coupling portion is provided which is connected in series in the axial direction to a toothed portion of a sun gear of the planetary gear set and is spline connected to a rotor shaft of a motor. Accordingly, the toothed portion of the sun gear can be small so a planetary gear reduction mechanism with a high reduction ratio can be realized and the motor can be reduced in size.

Also, vibrations from the planetary gear set, motor noise, or vibrations from bearings and the like tend to travel through the carrier to the case, and depending on the structure of the case, the vibrations that are transmitted to the case may be amplified, causing significant vibration and noise. Therefore, in order to prevent this, Japanese Patent Application Publication No. 2005-308094 (JP-A-2005-308094) describes a support structure for a rotating member designed to suppress vibrations at portions of the case which have low rigidity from being amplified by providing an annular protruding portion that forms asperities on an inner periphery of a hole through which a motor output shaft passes, and engaging the carrier which serves as the output element of the planetary gear set with that protruding portion on the inner periphery.

A vehicular power transmitting apparatus such as that described above is expected to be effective in inhibiting the amplification of vibrations by the case, by increasing the rigidity of the case around the planetary gear set. However, in cases such as when the input shaft and the output shaft of the planetary gear set are not on the same axis, gear noise from the teeth surfaces of the pinion gears and the sun gear, which are rotating at high speed, striking unevenly may be transmitted to the case and amplified. Also, motor noise and noise from the bearings may also be transmitted to the case by the planetary gear set and amplified.

In particular, in the front-drive power transmitting apparatus for a four-wheel-drive vehicle such as that described above, there are a plurality of planetary gear sets, which have become increasingly smaller as a result of the demand for compactness, as well as two motors so the attenuation effect of vibration and noise by the case is insufficient.

SUMMARY OF THE INVENTION

This invention thus provides a vehicular power transmitting apparatus that reliably minimizes vibration and noise such as gear noise.

One aspect of the invention relates to a vehicular power transmitting apparatus that includes a case; a planetary gear set which has a plurality of gears and a carrier housed in the case, and which reduces rotation input to an input rotating element, from among the plurality of gears and the carrier, and outputs the reduced rotation from an output rotating element, from among the plurality of gears and the carrier; and a drive unit that has a stator that is fastened to the case by a fastening member so as to drive the input rotating element. The case has i) an annular support portion that surrounds an outer periphery of the planetary gear set and supports one from among the plurality of gears and the carrier of the planetary gear set, ii) an outer peripheral wall portion that surrounds the annular support portion, iii) a flange portion that forms a mounting surface on an outer portion of the outer peripheral wall portion, and iv) a dividing wall portion which extends from the annular support portion outward toward the outer peripheral wall portion and the flange portion, and forms the mounting surface with the flange portion, and divides spaces inside the case. Also, a joining portion, in which a fastening hole to which the fastening member is joined and whose axis passes through the dividing wall portion is formed, is integrally formed with the dividing wall portion.

According to this structure, the stator of the motor that is fastened to the case by the fastening member is very rigidly connected to the dividing wall portion of the case via the joining portion. That dividing wall portion is as high as the mounting surface and extends from the annular support portion that surrounds the planetary gear set to the flange portion on the outer peripheral side, so the stator of the motor is very rigidly connected to the highly rigid portion of the case that surrounds the planetary gear set. Accordingly, the stator of the motor is able to function as a so-called mass damper, which enables the attenuation effect on vibration and noise, such as gear noise, to be dramatically improved.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Hereinafter, example embodiments of the invention will be described with reference to the drawings.

Figure 1:
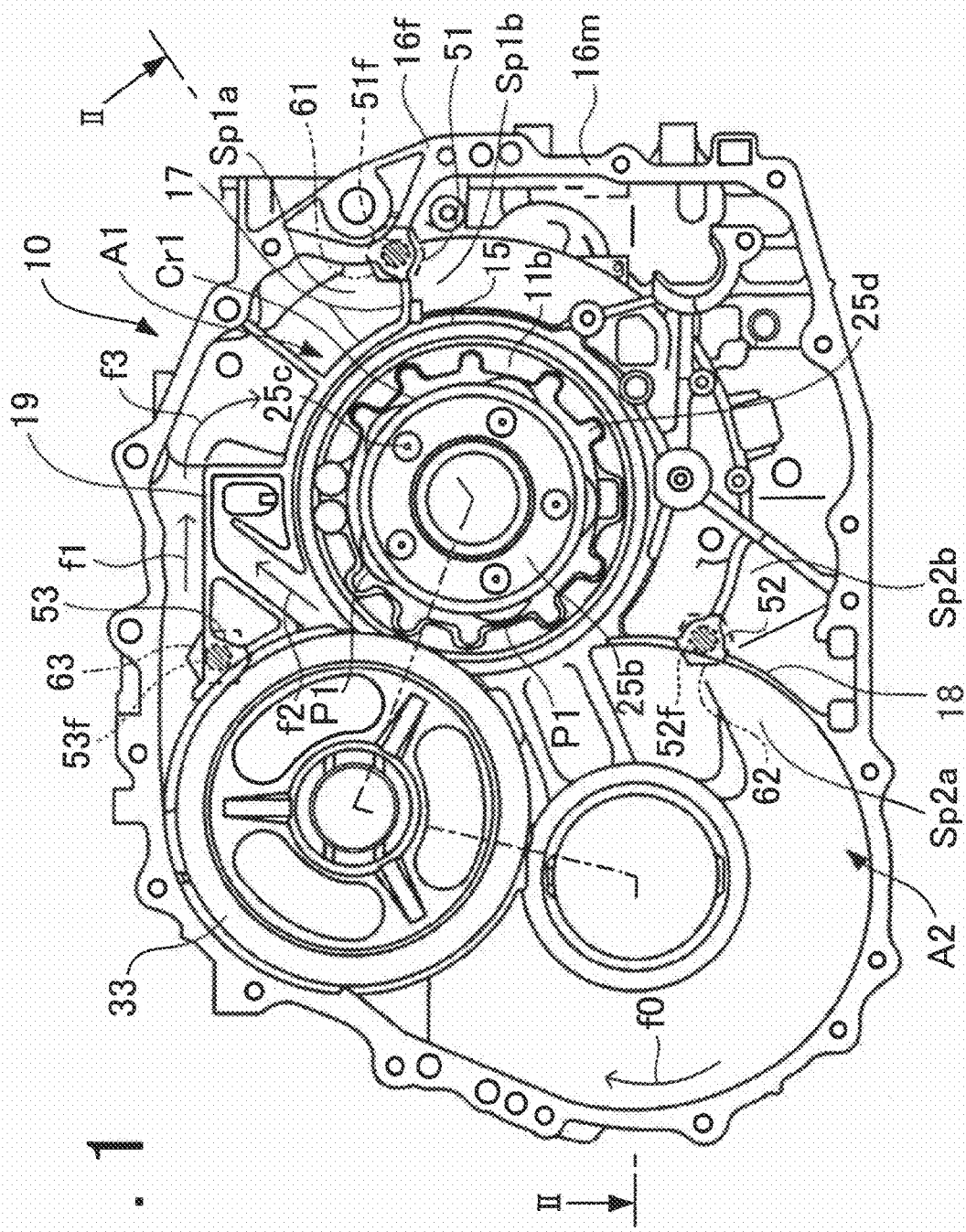
FIG. 1 is a side view, from the mounting side, of a carrier, with pinions mounted, of a planetary gear set when fit into a case of a vehicular power transmitting portion according to a first example embodiment of the invention.
Figure 2:
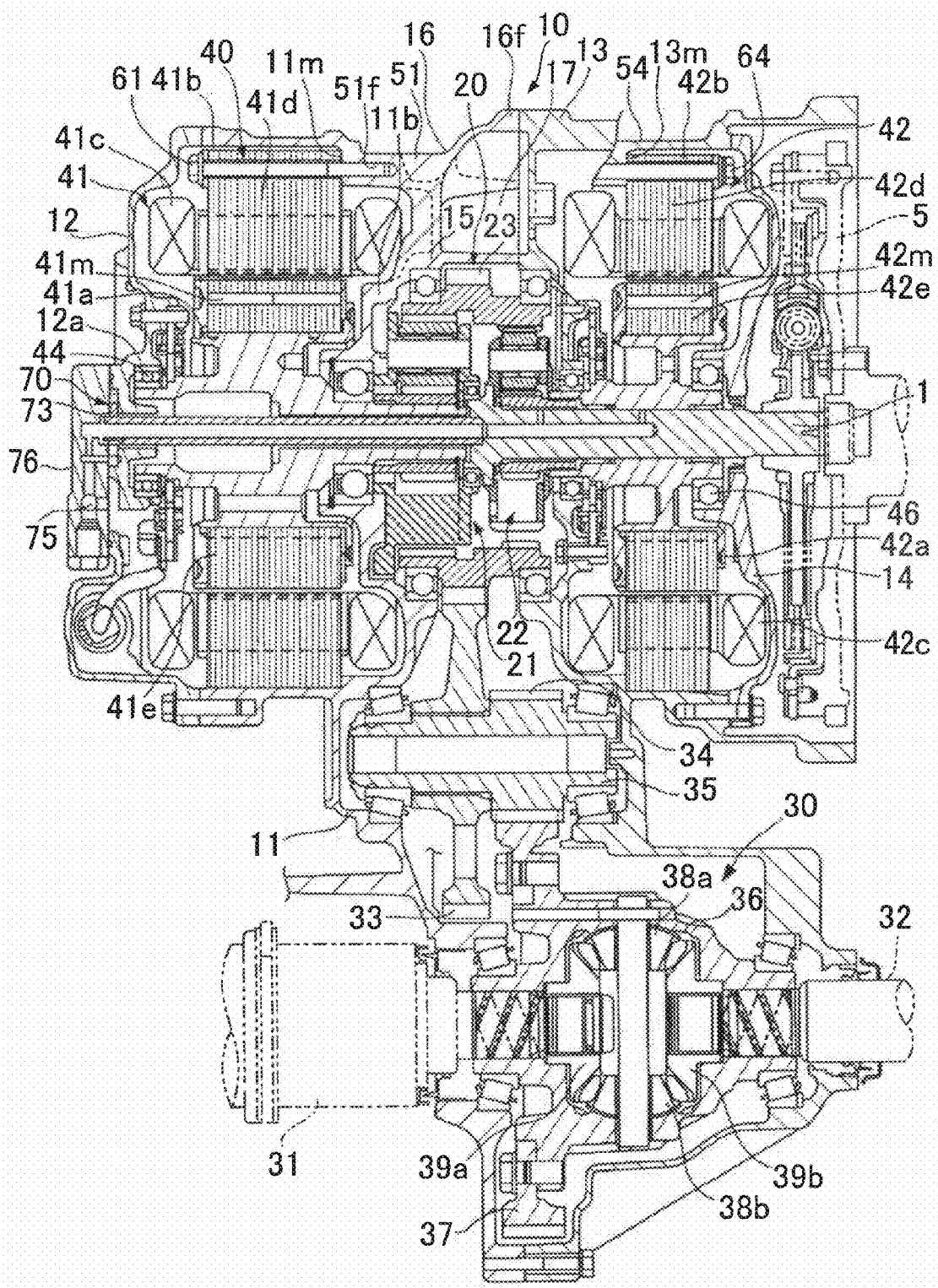
FIG. 2 is a sectional view taken along line II-II of FIG. 1, as viewed in the direction of the arrows.
Figure 3:
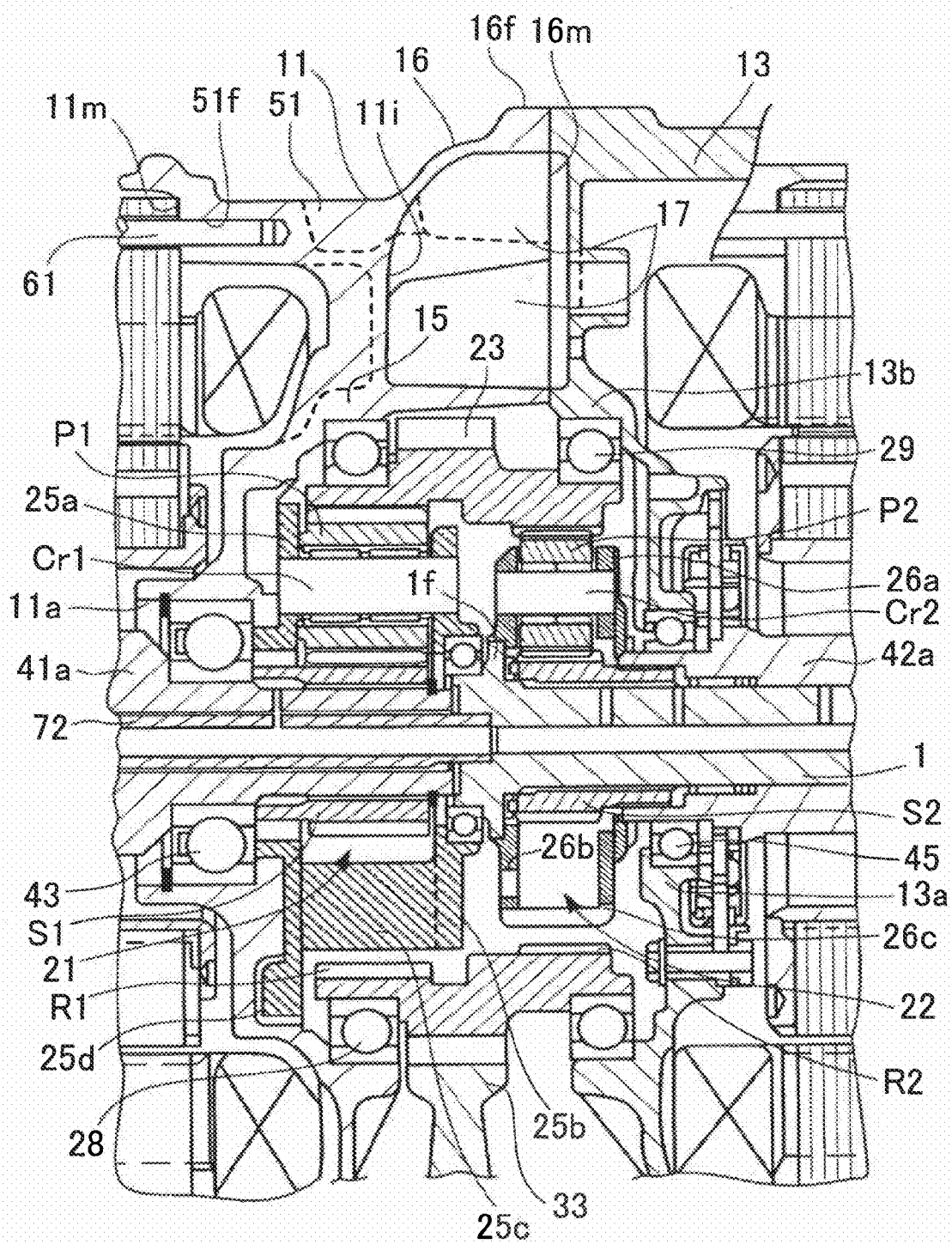
FIG. 3 is an enlarged view of part of FIG. 2.

FIGS. 1 and 2 are views of a vehicular power transmitting apparatus according to a first example embodiment of the invention. In the example shown in the drawings, the invention is applied to a front-drive power transmitting apparatus of a four-wheel-drive vehicle. Also, FIG. 1 is a side view, from the mounting side, of a carrier, with pinions mounted, of a planetary gear set when fit into a case according to the first example embodiment. FIG. 2 is a sectional view taken along line II-II in FIG. 1, as viewed in the direction of the arrows, and FIG. 3 is an enlarged view of part of FIG. 2.

First, as shown in FIGS. 1 and 2, the vehicular power transmitting apparatus of this example embodiment is a transaxle type vehicular power transmitting apparatus in which a planetary gear set 20 that makes up a shifting mechanism, and a differential mechanism 30 that is capable of differential output to left and right driveshafts 31 and 32 are housed in a case 11 which forms part of a transmission case 10. Further, driving means 40 for driving an input rotating element, which will be described later, of the planetary gear set 20 is also housed in the case 11. Moreover, the driving means 40 includes a driving motor 41 which is positioned at one end in the case 11 and a motor/generator 42 which is positioned at the other end in the case 11 and which can generate electricity by using power from the engine.

A first cover 12 is attached so that it is liquid-tight to one end side of the case 11, and a housing 13 that is ultimately fastened to and supported by the engine block side is fastened to the other end side of the case 11. Also, the inside of the housing 13 is divided by a second cover 14 into a portion that houses the motor/generator 42 and a portion that houses a damper element 5 which is a mechanism that transmits driving force from the engine. The case 11, the first cover 12, the second cover 14, and the housing 13 together form the transmission case 10.

The planetary gear set 20 includes a first planetary gear set portion 21 for reducing the output of the driving motor 41, and a second planetary gear set portion 22 that distributes power from the engine to the motor generator 42 and a counter drive gear 23 which will be described later. A ring gear R1 of the first planetary gear set portion 21, which is on the outer peripheral side of that first planetary gear set portion 21, and an outer peripheral ring gear R2 of the second planetary gear set portion 22, which is on the outer peripheral side of that second planetary gear set portion 22, are integrally formed with the counter drive gear 23 which is a rotation output element.

More specifically, as shown in FIG. 3, the first planetary gear set portion 21 has a sun gear S1 (i.e., an input rotating element) that is spline coupled to a rotor 41a of the driving motor 41, a ring gear R1 (i.e., a rotating element) with internal teeth that surrounds the sun gear S1, a plurality of pinions P1 which are provided at equidistant intervals in the circumferential direction around the sun gear S1 and are in mesh with both the sun gear S1 and the ring gear R1, and a carrier Cr1 (i.e., a fixed element) which rotatably supports the plurality of pinions P1 and is fixed to the case 11. The carrier Cr1 includes a pair of annular plate portions 25a and 25b, one positioned on each end side of the plurality of pinions P1, and a support portion 25c that connects these plate portions 25a and 25b together. Also, a plurality of rotation-preventing protrusions 25d (i.e., rotation stopping portions) are provided on the outer periphery of the annular plate portion 25a on the driving motor side of the carrier Cr1. Also, the second planetary gear set portion 22 has a sun gear S2 that is spline coupled to a rotor 42a of the motor/generator 42, a ring gear R2 with internal teeth that surrounds the sun gear S2, a plurality of pinions P2 which are provided at equidistant intervals in the circumferential direction around the sun gear S2 and are in mesh with both the sun gear S2 and the ring gear R2, and a carrier Cr2 (i.e., a fixed element) which rotatably supports the plurality of pinions P2 and is either fixed to a flange portion if of an input shaft 1 or coupled to the flange portion If so that it rotates in the same direction. The carrier Cr2 includes a pair of annular plate portions 26a and 26b, one positioned on each end side of the plurality of pinions P2, and a support portion 26c that connects these plate portions 26a and 26b together.

The counter drive gear 23 that is integrally formed with the ring gears R1 and R2 is in mesh with a counter driven gear 33. As shown in FIG. 2, this counter driven gear 33 is spline coupled to a counter shaft 35 on which a final drive gear 34 is integrally formed. The final drive gear 34 is in mesh with a final gear 37 that is fastened to a differential case 36 of the differential mechanism 30. Also, the differential case 36 houses a pair of differential pinions 38a and 38b, and a pair of left and right differential side gears 39a and 39b. Incidentally, the reduction by this kind of a plurality of gears 23, 33, 34, and 37, as well as the function of the differential mechanism 30 and the like is well known and so will not be described in detail here. Incidentally, one end portion of the counter drive gear 23 is rotatably supported by the annular support portions 25 of the case 11 via a bearing 28, and the other end portion of the counter drive gear 23 is rotatably supported via a bearing 29 at the inside of an annular thick portion 13b of the housing 13 that abuts against the annular support portions 25.

As shown in FIGS. 2 and 3, the driving motor 41 is, for example, a permanent magnet synchronous motor that has a rotor 41a to which a permanent magnet 41m is attached, and a stator 41b around which a three-phase coil 41c is wound. The rotor 41a is rotatably supported via a bearing 43 by a shaft hole portion 11a (see FIG. 3) of the case 11, and is spline coupled to the sun gear S1 of the first planetary gear set portion 21 at the end portion that is inside the case (i.e., the right end side in FIG. 3). Also, the outer end portion of the rotor 41a in the axial direction is rotatably supported via a bearing 44 by a bearing retaining portion 12a of the first cover 12.

The motor/generator 42 is, for example, a permanent magnet synchronous motor/generator that has a rotor 42a to which a permanent magnet 42m is attached, and a stator 42b around which a three-phase coil 42c is wound. The rotor 42a is rotatably supported by the input shaft 1, as well as rotatably supported via a bearing 45 by a shaft hole portion 13a of the housing 13, and spline coupled to the sun gear S2 of the second planetary gear set portion 22 at the end portion that is inside the case. Also, the engine side end portion of the rotor 42a is rotatably supported via a bearing 46 by the second cover 14 inside the housing 13.

The rotor 41a of the driving motor 41 has a permanent magnet, not shown, embedded in a rotor core 41e that opposes, across a small air gap, the inner periphery of the stator 41b such that a magnetic field is generated. Similarly, the rotor 42a of the motor/generator 42 also has a permanent magnet, not shown, embedded in a rotor core 42e that opposes, across a small air gap, the inner periphery of the stator 42b such that a magnetic field is generated.

Also, although not shown in detail, with the stator 41b of the driving motor 41, an annular yoke 41d with laminated magnetic material has a plurality of stator teeth that are separated by winding grooves, and a three-phase coil 41c is wound in the winding grooves of this yoke 41d. Similarly, with the stator 42b of the motor/generator 42, an annular yoke 42d made of laminated magnetic material has a plurality of stator teeth that are separated by winding grooves, and a three-phase coil 42c is wound in the winding grooves of this yoke 42d. Accordingly, the stator 41b is a member that has a relatively large mass within the case 11 and the stator 42b is a member than has a relatively large mass within the housing 13.

Meanwhile, as shown in FIGS. 1 to 3, the case 11 has a cylindrical shape with one end closed off by an end portion 11b that has a shaft hole portion 11a in it. More specifically, the case 11 includes i) an annular support portion 15 with one end open and one end closed, which surrounds the outer periphery of the planetary gear set 20 and supports for, example, the carrier Cr1 as a fixed element and the ring gear R1 as a rotating element from among the plurality of gears S1, S2, P1, P2, R1, R2 and carriers Cr1 and Cr2 of the planetary gear set 20, ii) an outer peripheral wall portion 16 that surrounds the annular support portion 15, iii) a flange portion 16f that forms a mounting surface 16m on an outer portion of the outer peripheral wall portion 16, and iv) a first dividing wall portion 17 and a second dividing wall portion 18 which extend to the outside in different directions from the annular support portion 15 toward the outer peripheral wall portion 16 and the flange portion 16f and which form the flange portion 16f and the mounting surface 16m.

Here, the first dividing wall portion 17 extends from an inner end surface 11i of the case 11 all the way up to the height of the mounting surface 16m so that it divides the space within the case 11 into two spaces Sp1a and Sp1b. Similarly, the second dividing wall portion 18 extends from the inner end surface 11i of the case 11 all the way up to the height of the mounting surface 16m so that it also divides the space within the case 11 into two spaces Sp2a and Sp2b.

Moreover, the first dividing wall portion 17 and the second dividing wall portion 18 either abut against corresponding opposing portions of the housing 13 or face corresponding opposing portions of the housing 13 across a minute gap. Also, the first dividing wall portion 17 and the second dividing wall portion 18 are formed as oil retaining wall portions that form either oil collecting areas A1 and A2 (so-called oil catch tanks) or lubricating oil passages between them and at least one of the annular support portion 15 and the outer peripheral wall portion 16. The first dividing wall portion 17 and the second dividing wall portion enable oil in the oil collecting areas A1 and A2 to flow down in small amounts from the minute gaps or cutout portions, not shown. Then, the lubricating oil that is stored on the inner end portion side of the case 11 is used to lubricate the counter drive gear 23, the counter driven gear 33, the final drive gear 34, and the bearing portions thereof and the like by the final gear picking up the oil within the oil collecting area A2 as it rotates, as shown by arrows f0, f1, f2, and f3 in FIG. 1, while some of the oil is sent to the oil collecting area A1 along the inner wall of the case 11.

On the inside of one end of the case 11 is formed a fastening surface 11m to which the stator 41b of the driving motor 41 is fastened. A first joining portion 51 is integrally provided with the first dividing wall portion 17 between this fastening surface 11m and the first dividing wall portion 17. In this first joining portion 51 is formed a fastening hole 51f (i.e., a first fastening hole) that has an axis which passes parallel to the central axis of the planetary gear set 20 (i.e., the central axis of the input shaft 1) through a thick area of the first dividing wall portion 17. A first fastening bolt 61 (i.e., a first fastening member) that passes through the stator 41b of the driving motor 41 is screw-fastened into this fastening hole 51f. The fastening hole 51f of the first joining portion 51 extends to a predetermined depth from the fastening surface 11m into the first dividing wall portion 17. The first dividing wall portion 17 is formed with thickness at the portion where it connects with the first joining portion 51. Also, the tip end portion of the first fastening bolt 61 is close to the first dividing wall portion 17.

Moreover, a second joining portion 52 is integrally provided with the second separating wall portion 18 between the fastening surface 11 and the second dividing wall portion 18. In this second joining portion 52 is formed a fastening hole 52f (i.e., a second fastening hole) that has an axis which passes parallel to the central axis of the planetary gear set 20 through a thick region of the second dividing wall portion 18. A second fastening bolt 62 (i.e., a second fastening member) that passes through the stator 41b of the driving motor 41 is screw-fastened into this fastening hole 52f. The fastening hole 52f of the second joining portion 52 extends to a predetermined depth from the fastening surface 11m into the second dividing wall portion 18. The second dividing wall portion 18 is formed with thickness at the portion where it connects with the second joining portion 52. Also, the tip end portion of the second fastening bolt 62 is close to the second dividing wall portion 18.

Furthermore, a third joining portion 53 is integrally provided with an oil passage forming wall portion 19 that is close to the counter driven gear 33, between the fastening surface 11m and the oil passage forming wall portion 19. In this third joining portion 53 is formed a fastening hole 53f (i.e., a third fastening hole) that has an axis which passes parallel to the central axis of the planetary gear set 20 through a region near the oil passage forming wall portion 19. A third fastening bolt 63 (i.e., a third fastening member) that passes through the stator 41b of the driving motor 41 is screw-fastened into this fastening hole 53f. Incidentally, the fastening holes 51f, 52f, and 53f are arranged at equidistant intervals, such as at 120-degree intervals, in a circle of a predetermined radius around the central axis of the annular support portion 15 (i.e., the central axis of the planetary gear set 20). The stator 41b of the driving motor 41 is fastened to the case 11 with equal clamping force by the first fastening bolt 61, the second fastening bolt 62, and the third fastening bolt 63.

Meanwhile, a fastening surface 13 to which the stator 42b of the motor/generator 42 is fastened is also formed in the housing 13. A fourth joining portion 54 and a fifth fastening portion, not shown, are provided between that fastening surface 13m and the mounting surface 16m of the case 11, e.g., between the first dividing wall portion 17 and the second dividing wall portion 18. The fourth joining portion 54 and the fifth fastening portion have fastening holes, not indicated with reference characters, that have axes which pass parallel to the central axis of the planetary gear set 20 through thick regions of the first dividing wall portion 17 and the second dividing wall portion 18. Further, a fourth fastening bolt 64 and a fifth bolt, not shown, which pass through the stator 42b of the motor/generator 42 are screw-fastened into those fastening holes, respectively.

The rotor 41a of the driving motor 41 has a cylindrical shape. A pipe-shaped oil pump driveshaft 72, which is engaged with the input shaft 1 so that it rotates in the same direction, is inserted into that rotor 41a. A drive rotor 73 positioned behind the driving motor 41 (i.e., on the left end side in FIG. 2) is mounted to this oil pump driveshaft 72. A driven rotor, not shown in detail, which constitutes both the drive rotor 73 and an oil pump 70 is rotatably supported by the first cover 12.

Moreover, an oil pump cover 76 that houses a relief valve 75 is mounted to the first cover 12. Oil which is drawn up from a predetermined location inside the case 11 by the oil pump 70 is supplied to the portions where the gears of the planetary gear set 20 mesh via a passage in the oil pump driveshaft 72 and a plurality of oil passages, not shown, formed in the rotor 41a and the input shaft 1, while being restricted to a predetermined set pressure by the relief valve 75.

Also, in this example embodiment, the first joining portion 51 and the second joining portion 52 (i.e., the first bolt fastening portion and the second bolt fastening portion) are each positioned on the side of the center line of the planetary gear set 20 away from the vehicle cabin. The protrusions 25d of the carrier Cr1, which is the fixed element of the planetary gear set 20, engage with the case 11 so that the carrier Cr1 is unable to rotate with respect to the case 11, near a virtual straight line that connects the first joining portion 51 and the second joining portion 52 together.

Next, the operation according to the vehicular power transmitting apparatus of this example embodiment will be described.

With the vehicular power transmitting apparatus of this example embodiment that is structured as described above, the stator 41b of the driving motor 41 which is fastened to the case 11 by the fastening members, i.e., the first fastening bolt 61, the second fastening bolt 62, and the third fastening bolt 63, is very rigidly connected to the first dividing wall portion 17 and the second dividing wall portion 18 of the case via the first joining portion 51 and the second joining portion 52, in particular, as well as connected with relatively high rigidity also to the oil passage forming wall portion 19 of the case 11 via the third joining portion 53. Further, the first dividing wall portion 17, the second dividing wall portion 18, and the oil passage forming wall portion 19 are all as high as the mounting surface 16m that abuts against an opposing portion of the housing 13. Of those wall portions, the first dividing wall portion 17 and the second dividing wall portion 18 extend from the annular support portion 15 that surrounds the planetary gear set 20 to the flange portion 16f on the outer peripheral side. As a result, the stator 41b of the driving motor 41 is very rigidly connected to a highly rigid portion of the case 11 that surrounds the planetary gear set 20.

Therefore, a so-called mass damper is formed that connects the stator 41b of the driving motor 41 as a secondary mass with a relatively large mass to an substantially highly rigid portion around the planetary gear set 20. That is, vibrations that are transmitted from the carrier Cr1, which is the fixed element of the planetary gear set 20, and the bearings around the counter drive gear 23 that is integrated with the ring gears R1 and R2 of the planetary gear set 20 and the like to the case 11 can be suppressed by dynamically absorbing them with the stator 41b (mass). As a result, the attenuation effect on the gear noise of the planetary gear set 20 and the vibrations and noise from the bearings around those gears can be dramatically improved.

Moreover, in this example embodiment, the outer peripheral wall portion 16 has, at one end, the fastening surface 11m to which the stator 41b is fastened. At the other end of the outer peripheral wall portion 16, the flange portion 16f forms the mounting surface 16m on the outer portion. Moreover, the fastening hole 51f of the first fastening portion 51 and the fastening hole 52f of the second fastening portion 52 extend from the fastening surface 11m toward the first dividing wall portion 17 and the second dividing wall portion 18. Accordingly, the stator 41b of the driving motor 41 that is connected to one end of the case 11 can be easily applied as a mass damper, such that the attenuation effect on the vibrations and noise, such as gear noise, can be dramatically improved.

In addition, the fastening hole 51f and the fastening hole 52f both have axes that pass through the dividing wall portions 17 and 18 parallel to the input shaft 1. This enables the stator 41b of the driving motor 41 to be safely fastened, as well as facilitates machining of the fastening holes 51f and 52f.

Also, the first dividing wall portion 17 and the second dividing wall portion 18 are formed by oil retaining wall portions that form the oil collecting areas A1 and A2 between them and at least one of the annular support portion 15 and the outer peripheral wall portion 16. As a result, the oil retaining wall portions that form the so-called oil catch tanks in the case 11 are effectively utilized such that the vibration and noise attenuation effect of the case 11 can be improved.

In this way, with the vehicular power transmitting apparatus of this example embodiment, the stator 41b of the driving motor 41 is very rigidly connected to the first dividing wall portion 17 and the second dividing wall portion 18 of the case via the first fastening portion 51 and the second fastening portion 52 by the first fastening bolt 61 and the second fastening bolt 62. Accordingly, the stator 41b of the driving motor 41 is very rigidly connected to a highly rigid portion of the case 11 that surrounds the planetary gear set 20 such that a so-called mass damper, in which the stator 41b of the driving motor 41 constitutes a secondary mass, can be applied to the case 11. As a result, the attenuation effect on the vibrations and noise, such as gear noise, can be dramatically improved without increasing the number of parts.

Figure 4:
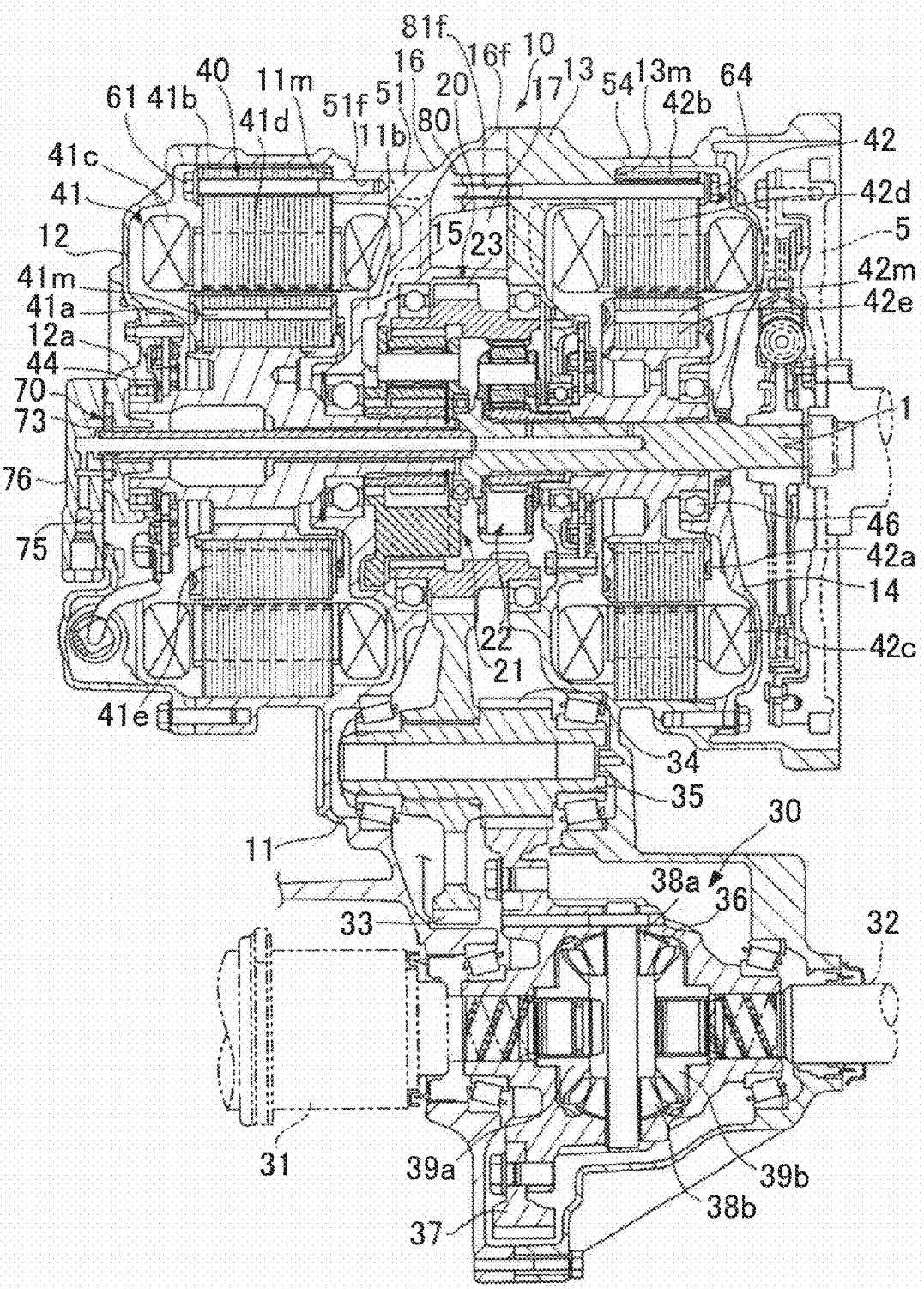
FIG. 4 is a sectional view of the main portion of a vehicular power transmitting apparatus according to a second example embodiment of the invention.

FIG. 4 is a sectional view of the main portion of a vehicular power transmitting apparatus according to a second example embodiment of the invention. Incidentally, the following description of the vehicular power transmitting apparatus according to this second example embodiment will focus particularly on the differences from the vehicular power transmitting apparatus according to the first example embodiment so structure of the vehicular power transmitting apparatus according to the second example embodiment that is the same as the structure of the vehicular power transmitting apparatus according to the foregoing first example embodiment will be referred to using the same reference numerals as those shown in FIGS. 1 to 3.

As shown in FIG. 4, in the vehicular power transmitting apparatus according to this second example embodiment, the outer peripheral wall portion 16 has a fastening surface to which the stator 42b of the motor/generator 42 is fastened on the other end side (the "other end side" is actually an arbitrary end side but is referred to as the "other end side" for descriptive purposes because it is referred to that way in the foregoing first example embodiment) as part of the mounting surface 16m. The part of the mounting surface 16m that serves as the fastening surface is formed by the first dividing wall portion 17, the second dividing wall portion 18, and the flange portion 16.

Also, the first dividing wall portion 17 and the second dividing wall portion 18 are both integrally formed with joining portions 81. Fastening holes 81f in those joining portions 81 extend from the mounting surface 16m, which serves as the fastening surface, into the first dividing wall portion 17 and the second dividing wall portion 18, respectively. That is, a plurality of the fastening portions 81 corresponding to the first dividing wall portion 17 and the second dividing wall portion 18 have the fastening holes 81f which are bolt holes that are open in the fastening surface 16m.

In this case, the stator 42b of the motor/generator 42 that is fastened to the other end side of the case 11 serves as a mass damper so the attenuation effect on the vibration and noise, such as gear noise and the like, can be dramatically improved.

Further, in this second example embodiment, the driving means 40 may include the driving motor 41 that is positioned on one end side of the case 11, and the motor/generator 42 that can generate electricity by using power from the engine and is positioned on the other end side of the case 11. Incidentally, the outer peripheral wall portion 16 may also have, on the one end side, the first fastening surface 11*m* to which the stator 41*b* of the driving motor 41 is fastened, and on the other end side, a mounting surface 16*m* that serves as a second fastening surface to which the stator 42*b* of the motor/generator 42 is fastened. Also, the fastening holes 51*f* and 52*f* of the first and second fastening portions 51 and 52, respectively, may be formed by fastening holes 51*f* and 52*f* on one side that extend from the first fastening surface 11*m* into the first and second dividing wall portions 17 and 18, respectively, and the fastening holes 81*f* on the other side that extend from the mounting surface 16*m* (i.e., the second fastening surface) into the first and second dividing wall portions 17 and 18.

In this case, the stator 41*b* of the driving motor 41 that is fastened to one end side of the case 11 and the stator 42*b* of the motor/generator 42 that is fastened to the other end side of the case 11 both serve as mass dampers so the attenuation effect on vibration and noise, such as gear noise, can be dramatically improved.

Incidentally, in each of the foregoing example embodiments, the joining portion to which the fastening member is fastened is integrally formed with the oil retaining wall portion. Alternatively, however, that joining portion may be formed in a rib shape that extends from the annular support portion that supports the planetary gear set to the outer peripheral flange portion, and integral with another wall portion such that the end surface of the joining portion is the same height as the mounting surface 16*m*. Also, the bolt fastening hole of the fastening portion may also have an axis that passes through the center of a wall such as the oil retaining wall portion, or an axis that passes in substantially the direction of the wall surface through that wall surface.

As described above, the invention very rigidly connects the stator 41*b* of the driving motor 41 and/or the stator 42*b* of the motor/generator 42 to the dividing wall portions 17 and 18 of the case via the joining portions 51, 52, or 81 or the like by fastening members such as bolts. Therefore, by very rigidly connecting the stator 41*b* or 42*b* to a highly rigid portion of the case 11 that surrounds the planetary gear set 20, the stator 41*b* or 42*b* can be made to function as a so-called mass damper, thus enabling the attenuation effect on vibration and noise, such as gear noise, to be dramatically improved. Accordingly, the invention is generally useful for vehicular power transmitting apparatuses, and in particular, those vehicular power transmitting apparatuses that aim to reduce such vibrations and noise.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

What is claimed is:

1. A vehicular power transmitting apparatus comprising:
    a case;
    a planetary gear set which has a plurality of gears and a carrier housed in the case, and which reduces rotation input to an input rotating element, from among the plurality of gears and the carrier, and outputs the reduced rotation from an output rotating element, from among the plurality of gears and the carrier; and
    a motor-type drive unit that has a stator that is fastened to the case by a fastening member so as to drive the input rotating element, wherein
    the case has an annular support portion that surrounds an outer periphery of the planetary gear set and supports one from among the plurality of gears and the carrier of the planetary gear set, an outer peripheral wall portion that surrounds the annular support portion, a flange portion that forms a mounting surface on an outer portion of the outer peripheral wall portion, and a dividing wall portion which extends from the annular support portion outward toward the outer peripheral wall portion and the flange portion, and forms the mounting surface with the flange portion, and divides spaces inside the case; and
    a joining portion, in which a fastening hole to which the fastening member is joined and whose axis passes through the dividing wall portion is formed, is integrally formed with the dividing wall portion.

2. The vehicular power transmitting apparatus according to claim 1, wherein:
    the outer peripheral wall portion has a fastening surface to which the stator is fastened on one end side;
    the flange portion forms the mounting surface on the outer portion of the other end side of the outer peripheral wall portion; and
    the fastening hole in the joining portion extends from the fastening surface into the dividing wall portion.

3. The vehicular power transmitting apparatus according to claim 1, wherein
    the motor-type drive unit includes a motor/generator that is capable of generating electricity using power from an engine of the vehicle;
    the dividing wall portion and the flange portion form a fastening surface to which the motor/generator is fastened, on one end of the outer peripheral wall portion; and
    the fastening hole of the joining portion extends from the fastening surface into the dividing wall portion.

4. The vehicular power transmitting apparatus according to claim 1, wherein
    the motor-type drive unit includes a driving motor positioned at one end side of the case and a motor/generator that is able to generate electricity by using power from an engine of the vehicle;
    a first fastening surface to which a stator of the driving motor is fastened is provided at one end side of the outer peripheral wall portion, and a second fastening surface to which a stator of the motor/generator is fastened is provided at the other end side of the outer peripheral wall portion; and
    the fastening hole of the joining portion extends from the first fastening surface into the dividing wall portion while a fastening hole which is provided at the other end side of the outer peripheral wall portion extends from the second fastening surface into the dividing wall portion.

5. The vehicular power transmitting apparatus according to claim 1, wherein the fastening hole has an axis that passes through the dividing wall portion parallel to the input rotating element.

6. The vehicular power transmitting apparatus according to claim 1, wherein the dividing wall portion is formed by an oil retaining wall portion that forms an oil collecting area between the dividing wall portion and at least one of the annular support portion and the outer peripheral wall portion.

* * * * *